(12) United States Patent
Lubben

(10) Patent No.: US 11,926,209 B2
(45) Date of Patent: Mar. 12, 2024

(54) ELECTRIC POWER TAKE OFF

(71) Applicant: Deere & Company, Moline, IL (US)

(72) Inventor: Jeffrey L. Lubben, Hudson, IA (US)

(73) Assignee: Deere & Company, Moline, IL (US)

( * ) Notice: Subject to any disclaimer, the term of this patent is extended or adjusted under 35 U.S.C. 154(b) by 315 days.

(21) Appl. No.: 16/794,936

(22) Filed: Feb. 19, 2020

(65) Prior Publication Data
US 2021/0252975 A1 Aug. 19, 2021

(51) Int. Cl.
*B60K 17/28* (2006.01)
*B60K 25/06* (2006.01)
*B60L 1/00* (2006.01)
*B60W 30/188* (2012.01)

(52) U.S. Cl.
CPC .............. *B60K 17/28* (2013.01); *B60K 25/06* (2013.01); *B60L 1/003* (2013.01); *B60W 30/1888* (2013.01)

(58) Field of Classification Search
CPC .. B60K 17/28; B60K 25/06; B60K 2025/005; B60L 1/003; B60W 30/1888
See application file for complete search history.

(56) References Cited

U.S. PATENT DOCUMENTS

| | | | | |
|---|---|---|---|---|
| 2,697,457 A * | 12/1954 | Lawrence | ............ | A01D 34/902 30/340 |
| 3,192,792 A * | 7/1965 | Szaj | ......................... | F16H 61/40 477/68 |
| 3,279,215 A * | 10/1966 | Douglas | ................... | F16D 3/06 464/115 |
| 7,900,724 B2 * | 3/2011 | Promersberger | ....... | B60K 25/06 180/53.4 |
| 8,103,395 B2 * | 1/2012 | Bissontz | ............... | B60W 20/10 180/164 |
| 8,469,127 B2 * | 6/2013 | Tarasinski | ................ | B60K 6/26 180/65.285 |
| 9,315,187 B2 * | 4/2016 | Stenson | ............ | B60W 30/1888 |
| 9,637,000 B2 * | 5/2017 | Husson | ................ | B60W 20/00 |
| 10,111,390 B2 * | 10/2018 | Morselli | ................. | A01F 15/04 |
| 2004/0204276 A1 * | 10/2004 | Tarasinski | ................ | B60L 7/00 903/910 |
| 2005/0056334 A1 * | 3/2005 | Bruske | ................ | D03C 9/0683 139/91 |

(Continued)

FOREIGN PATENT DOCUMENTS

CA 2711967 A1 * 8/2009 ............. F16H 47/04
CN 103754134 A * 4/2014

(Continued)

OTHER PUBLICATIONS

German Search Report issued in application No. DE102021200317.6, dated Jul. 15, 2021, 10 pages.

*Primary Examiner* — James A Shriver, II
*Assistant Examiner* — Michael T. Walsh
(74) *Attorney, Agent, or Firm* — Tucker Ellis LLP

(57) ABSTRACT

Systems and methods are provided for an electrically driven power take-off (PTO). A motor generator is coupled to a PTO output shaft. The motor generator is capable of varying rotation speeds and direction. By extension, the PTO output shaft may also have varying speeds and directions. A control system is also provided to control the motor generator and, therefore, the PTO output shaft in accordance with a plurality of operating mode.

18 Claims, 5 Drawing Sheets

(56) References Cited

U.S. PATENT DOCUMENTS

| | | | |
|---|---|---|---|
| 2009/0095549 A1* | 4/2009 | Dalum | B60L 1/00 180/65.265 |
| 2010/0108413 A1* | 5/2010 | Lang | A01F 15/0841 180/53.1 |
| 2014/0026691 A1* | 1/2014 | Huber | B60W 10/06 74/15.86 |
| 2015/0210151 A1* | 7/2015 | Husson | B60W 20/00 903/903 |
| 2019/0281755 A1* | 9/2019 | Heckeroth | A01B 59/061 |
| 2021/0252987 A1* | 8/2021 | Brenninger | B60K 1/04 |
| 2022/0396137 A1* | 12/2022 | Glöckner | B60K 17/02 |

FOREIGN PATENT DOCUMENTS

| | | | | |
|---|---|---|---|---|
| CN | 111133182 A * | 5/2020 | | B60K 35/00 |
| DE | 102005044179 A1 | 5/2007 | | |
| DE | 202006021015 U1 | 12/2011 | | |
| DE | 102012005299 A1 * | 9/2013 | | B60K 17/28 |
| DE | 102017210563 A1 | 1/2018 | | |
| DE | 102017210563 A1 * | 1/2018 | | B60K 17/28 |
| DE | 102019200490 A1 | 8/2019 | | |
| DE | 102019214355 A1 * | 3/2021 | | |
| WO | WO-2011056266 A1 * | 5/2011 | | B60K 25/00 |
| WO | WO-2017145178 A1 * | 8/2017 | | |
| WO | WO-2019070664 A1 * | 4/2019 | | B60K 35/00 |

\* cited by examiner

ELECTRIC POWER TAKE OFF

BACKGROUND

In vehicles, particularly agricultural vehicles, a power take-off (PTO) provides a power source for mountable attachments. In such vehicles, PTO is often mechanically driven. For instance, the PTO is driven off the engine crankshaft or other live shaft within the vehicle's drivetrain. Such mechanical arrangements typically also include a clutch, a brake, a gear train, plumbing, housing, control system, and other support structures. Accordingly, conventional PTO solutions are complex mechanical systems occupying considerable space within the vehicle architecture.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a system is provided. The system includes an electric motor having an output coupled to a power take-off (PTO) stub shaft for coupling to an agricultural accessory. The system also includes a controller coupled to the electric motor and configured to control operation of the electric motor to regulate rotation of the PTO stub shaft via the electric motor in accordance with a plurality of operating modes In another implementation, a method for an agricultural machine is provided. The method includes receiving user input indicative of a selection of an operating mode for a power take-off (PTO) of the agricultural machine. The method also includes controlling an electric machine coupled to a PTO stub shaft to enable rotation of the PTO stub shaft in accordance with the operating mode selected by the user input.

In still another implementation, a non-transitory computer-readable storage medium having stored thereon computer-executable instructions is provided. The instructions, when executed by a processor, configure the processor to receive a selection of an operating mode from a plurality of operating modes for a power take-off (PTO) system. The PTO system includes an electric motor coupled to a PTO stub shaft via a planetary gear system. The instructions further configure the processor to control a rotation of the PTO stub shaft based on the operating mode selected, wherein the controlling the rotation of the PTO stub shaft includes controlling operation of the electric motor.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

Various non-limiting embodiments are further described in the detailed description given below with reference the accompanying drawings, which are incorporated in and constitute a part of the specification.

DETAILED DESCRIPTION

Figure 1:
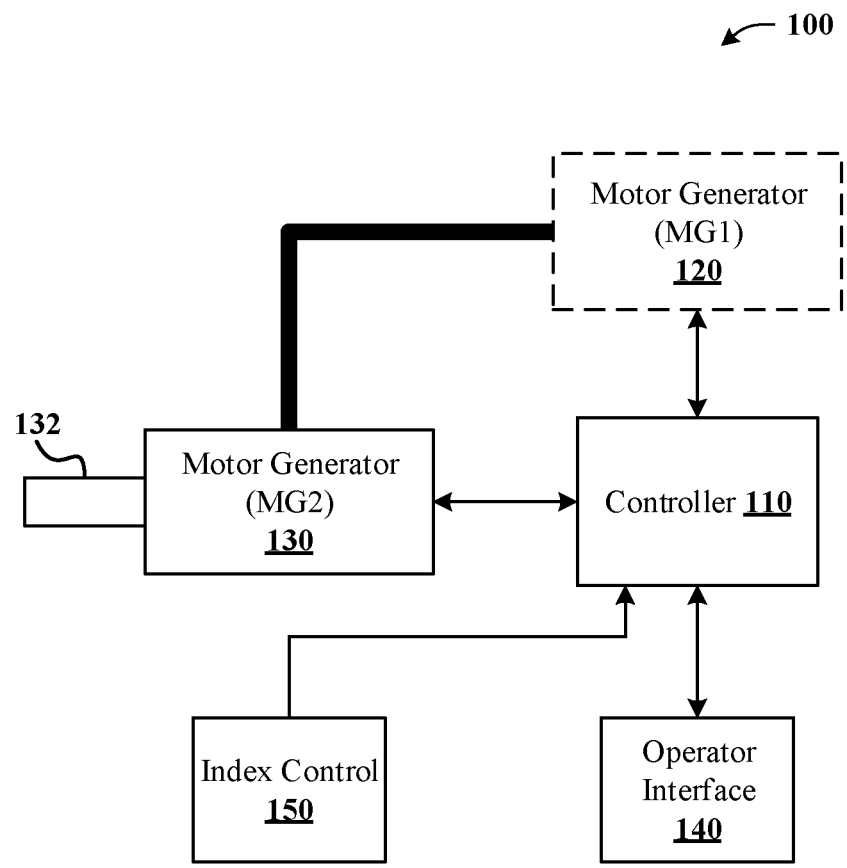
FIG. 1 illustrates an exemplary, non-limiting embodiment of a power take-off system according to various aspects.

As described above, mechanically driven PTO solutions couple to an engine crankshaft or other live shaft of a vehicle's drivetrain. These systems also include additional support structures that increase cost and complexity, as well as consume significant volume within the vehicle. In accordance with various embodiments, an electrically driven power take-off is provided. A motor-generator, an electric motor, or other electric machine is coupled to a PTO output shaft via a gear reduction. The electrically driven PTO eliminates the mechanical coupling of the output shaft to the engine crankshaft or other live shaft, as well as the associated hardware (e.g. clutch, gearing, etc.). The electrically driven PTO provides varying rotation speeds and direction. The electrically driven PTO provides a wide speed range to support a variety of available attachments powered via PTO systems. The electrically driven PTO can be readily reconfigured and operated in a plurality of modes corresponding to industry standards.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Referring initially to FIG. 1, an electrically driven power take-off (PTO) system 100 is illustrated. The system 100 may be included in or utilized by an agricultural vehicle, such as a tractor, to provide a power take-off for implements. Electrical energy may be generated onboard the agricultural vehicle by a motor-generator (MG1) 120, which can be transferred to a motor generator (MG2) 130. MG1 120 may include, for example, an engine of the agricultural vehicle, an alternator, and/or an inverter configured to power and control generation and transfer of electrical energy.

MG2 130 may be coupled to and drive a power take-off (PTO) output shaft or stub shaft 132. The PTO stub shaft 132 provides a connection for accessory implements attachable to the agricultural vehicle. The PTO stub shaft 132 may be a front PTO or a rear PTO. The MG2 130, in an embodiment, utilizes the electrical energy provided by MG1 120 and coverts the electrical energy to mechanical energy in the form of rotation of the PTO stub shaft 132.

MG2 130 is configured with a large speed range and an ability to operate effectively in either rotational direction.

Accordingly, MG2 130 can drive the PTO stub shaft 132 according to any industry standardized speed, mode, or direction. To provide such flexibility, the system 100 includes a controller 110 configured to control operation of MG2 130.

Controller 110 may include be a microcontroller, a system-on-a-chip, a FPGA, or other logic circuitry. For instance, controller 110 may include a processor, a computer memory (e.g. a non-transitory computer-readable storage medium), and interfaces to acquire inputs and send signals to various components of system 100. The memory may include computer-executable instructions that configure the processor to carry out the functions of controller 110 in system 100. In some embodiments, the controller 110 may be an electronic control unit such as an engine control unit (ECU) or the like. As such, the controller 110 may include a microcontroller, memory (e.g., SRAM, EEPROM, Flash, etc.), inputs (e.g., supply voltage, digital inputs, analog inputs), outputs (e.g., actuator inputs, logic outputs), communication interfaces (e.g., bus transceivers), and embedded software.

According to an embodiment, controller 110 controls operation of MG2 130 in accordance with a plurality of operating modes. The plurality of operating modes may include, but are not limited to, an alignment mode, a jog mode, a steady state mode, a ground speed rated mode, and an engine speed rated mode. Some modes may have associated sub-modes. For example, the jog mode may include a forward jog mode and a reverse jog mode. The engine speed rated mode may include a standard engine speed rated mode and a reduced engine speed rated mode.

In a given operating mode, controller 110 maintains a speed of MG2 130, and thereby a speed of the PTO stub shaft 132, in accordance with the mode. In some modes, the speed is based on an input. The input may be a reference speed of another apparatus or the input may be a user input. For example, the reference speed may be an engine speed. The controller 110 is configured to maintain the speed of the PTO stub shaft 132 in proportion to the engine speed. The ratio maintained may be pre-determined (e.g. a standard ratio) or configurable based on a particular implement coupled to the PTO stub shaft 132. In another example, the reference speed may be a ground speed of the vehicle, in which case the controller 110 maintains the speed of the PTO stub shaft 132 in proportion to the speed of the vehicle. The ground speed, in an embodiment, may be indirectly determined from engine speed based on a configurable relationship.

In other modes, the input is a user input that provides, for example, a steady speed to be maintained regardless of vehicle or engine speed. In other examples, the user input is a signal indicative of an operator's manipulation of jog controls, or other controls designed to facilitate indexing of the PTO stub shaft 132. Accordingly, system 100 may include an index control 150 to activate an alignment mode and an operator interface 140 that enables other mode selections, jog control, etc. The operator interface 140 may be incorporated into in-cab controls of the agricultural vehicle. The index control 150, in an embodiment, may be positioned on an exterior of the vehicle in proximity to the PTO stub shaft 132.

In general, however, the controller 110 can regulate MG2 130 to output substantially any speed at the PTO stub shaft 132. Without a mechanical coupling to a vehicle's drivetrain, the electric PTO system 100 is more flexible in its operation. For example, operation of the system 100 (e.g. implement travel speed) may be optimized based on motor torque. This allows better utilization of implement capacity or tractor capacity. Further, overload conditions can be sensed and an appropriate warning issued by the system.

In another example, the electric PTO system 100 can provide active braking and position holding features. For instance, the controller 110 can reverse a current through MG2 130 to actively brake an attached implement. Harvested power may be reacted by the engine or sent to a storage device. Active braking can be combined with a separate mechanical brake, which may be actuated electrically or hydraulically to hold, slow, or stop the implement. In other words, electrical, active braking is not mutually exclusive with other braking system. However, in some embodiments, braking control may be exclusive of clutch control.

Further, the controller 110 can sense a position of the PTO stub shaft 132, via MG2 130 or a separate sensor, to detect motion (e.g. unintended motion from an externally applied torque). In response, the controller 110 can utilize this position signal to dynamically control MG2 130 to motor in a direction opposite of the externally applied torque to cancel the motion.

Moreover, while the electric PTO system 100 may be powered by a vehicle's engine, it is to be appreciated that the system 100 may be powered by an auxiliary power source (e.g. a battery, a fuel cell, etc.). Accordingly, the electric PTO system 100 may be operated even when a host vehicle's engine is shut off provided an adequate supply of electrical energy is available from the auxiliary power source.

Figure 2:
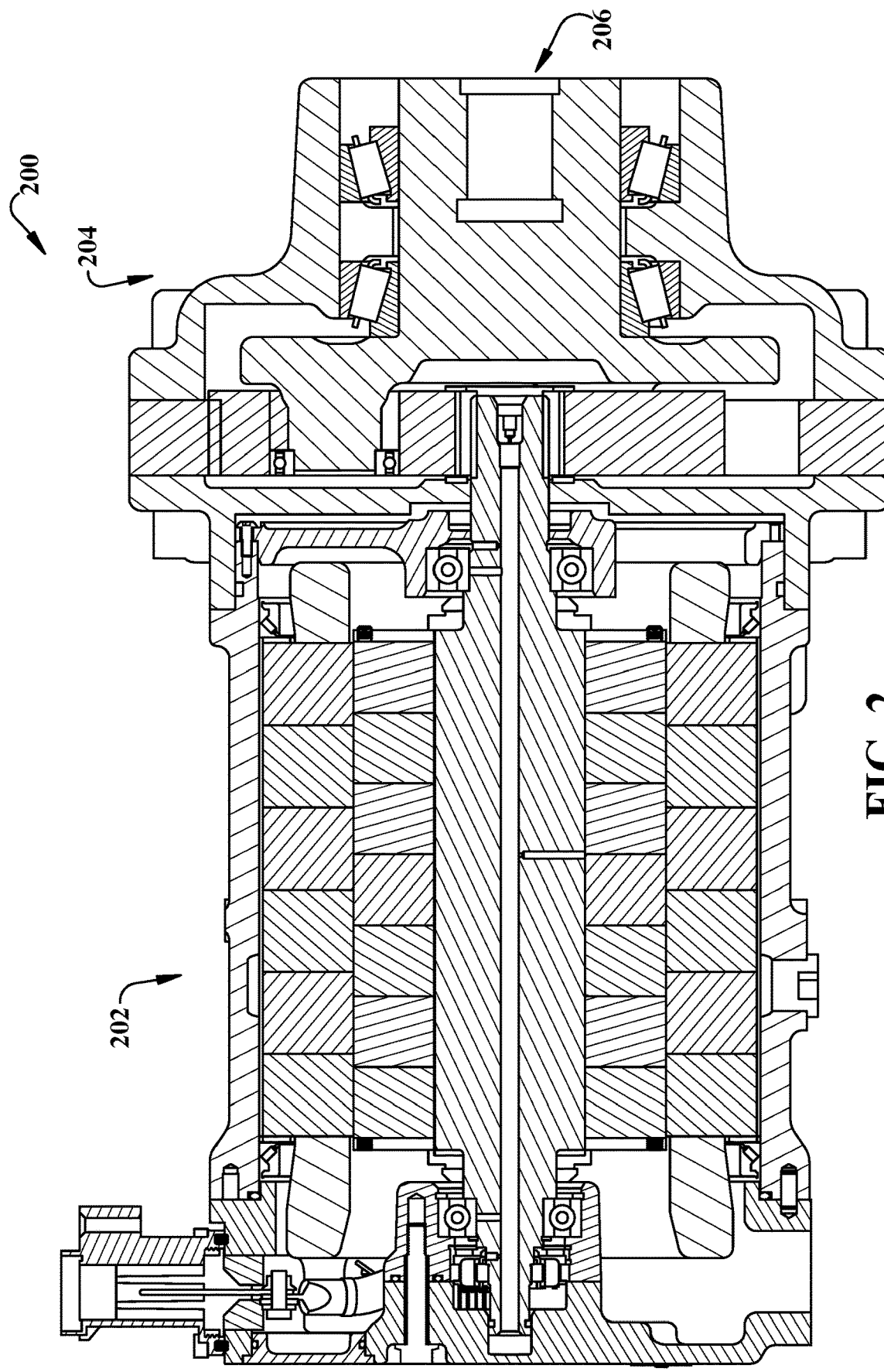
FIG. 2 illustrates an exemplary, non-limiting embodiment of an electric machine for driving a power take-off stub shaft in accordance with an aspect.

Turning to FIG. 2, an exemplary, non-limiting embodiment of an electric machine 200. Machine 200 may be utilized in electric PTO system 100, for example, as MG2 130. As shown in FIG. 2, an electric motor 202 is coupled to a PTO output shaft 206 via a planetary gear 204. In FIG. 2, the output shaft 206 is connected in line with the planetary gear 204 and electric motor 202. It is to be appreciated that an off-axis arrangement may be employed. The planetary gear 204 may be configured to reduce a desired operating speed of the electric motor 202 to a desired stub shaft speed. For example, the planetary gear 204 may reduce an operating speed of 5715 rpm to 1000 rpm.

Figure 3:
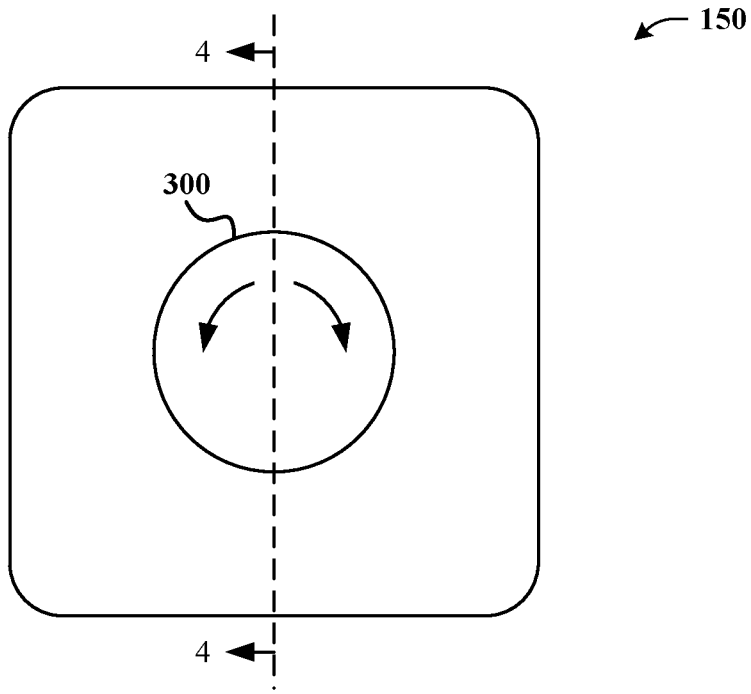
FIG. 3 illustrates an exemplary, non-limiting embodiment of an index control knob in accordance with an aspect.
Figure 4:
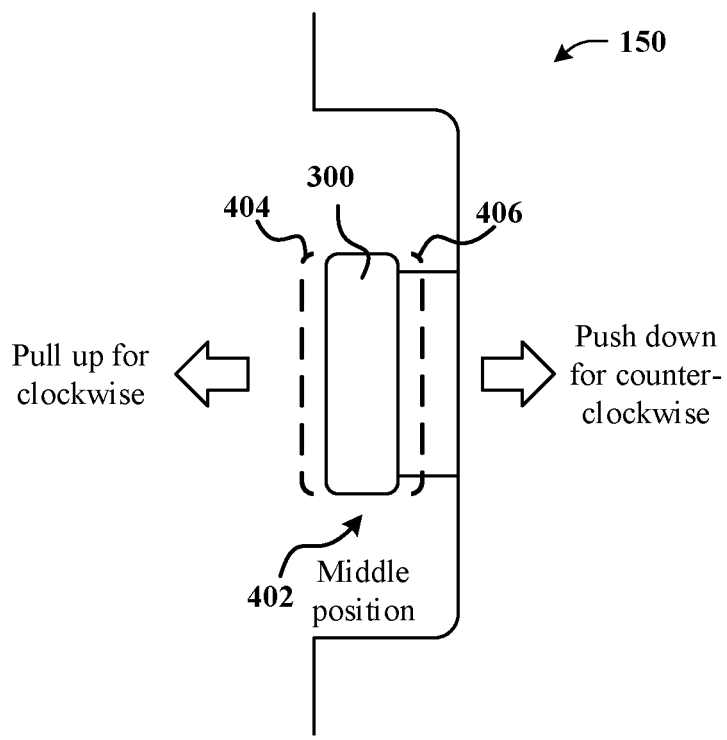
FIG. 4 illustrates an exemplary, non-limiting embodiment of an index control knob in accordance with an aspect.

Referring now to FIGS. 3 and 4, an exemplary, non-limiting embodiment of index control 150 is illustrated. The index control 150 may be positioned on an exterior of the vehicle in proximity to a PTO output shaft. The index control 150 includes an index knob 300, which can be rotated clockwise or counter-clockwise to effect a corresponding rotation of the PTO output shaft. For a counter-clockwise rotation, the knob 300 can be pushed down from a neutral middle position 402 to an inward position 406. For a clockwise rotation, the knob 300 can be pulled up from the neutral middle position to an outward position 404. As shown in FIG. 4, the knob 300 may be recessed to protect the knob 300 from damage. Turning the knob 300 clockwise and/or counter-clockwise provides input to controller 110, for example, to cause MG2 130 to slowly motor the PTO output shaft. The slow rotation facilitates indexing the shaft to an implement. As an alternative to knob 300, push buttons can be provided near the PTO output shaft to signal clockwise or counter-clockwise rotation.

Figure 5:
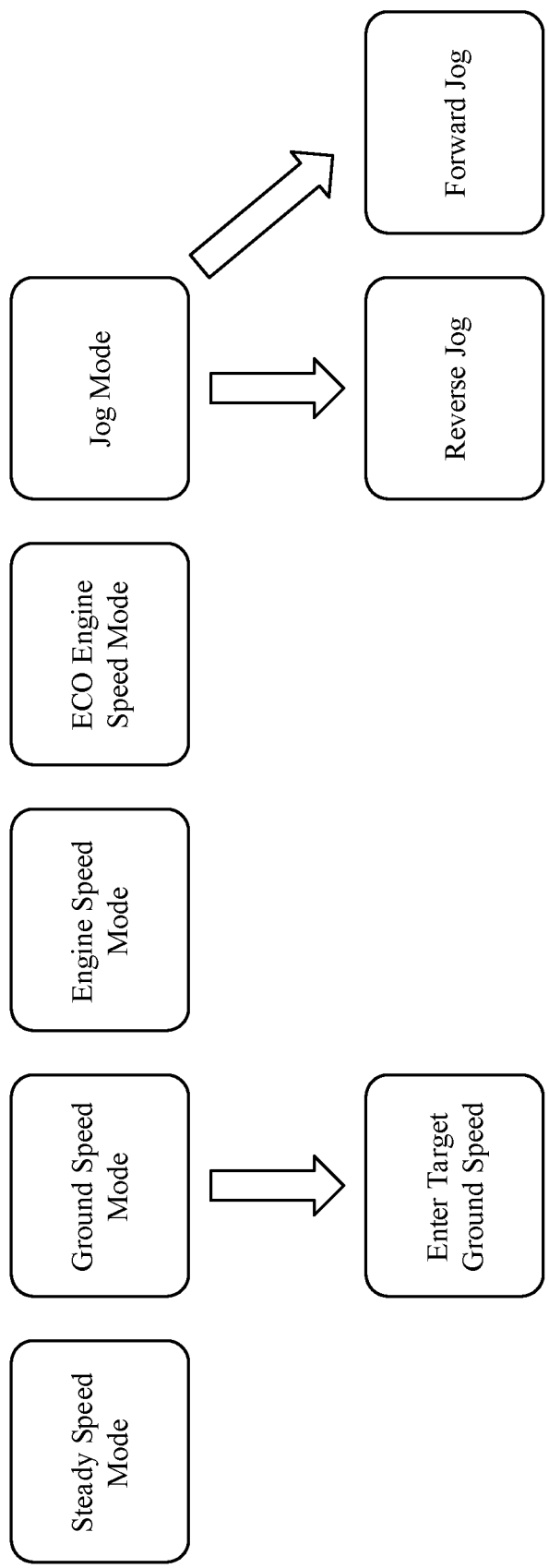
FIG. 5 illustrates an exemplary, non-limiting embodiment of a menu structure for a user interface according to various aspects.

Turning to FIG. 5, an exemplary, non-limiting embodiment of a menu structure for controlling the PTO operating modes is depicted. The menu structure can used for an in-cab user interface. According to an aspect, the menu structure is hierarchical, where available modes are provided in a top row for selection. In the example of FIG. 5, those modes include a steady state mode, a ground speed mode, an engine speed mode, an ECO engine speed mode, and a jog mode. An alignment mode, as described previously, may be activated and controlled via the index control 150. In some modes, additional input may be entered, which is shown in FIG. 5 as a transition to a second row. For instance, when the ground speed mode is selected, the menu transitions to enable entry of a target ground speed. In another example, selection of jog mode provides in-cab controls for causing a forward jog or a reverse jog.

Figure 6:
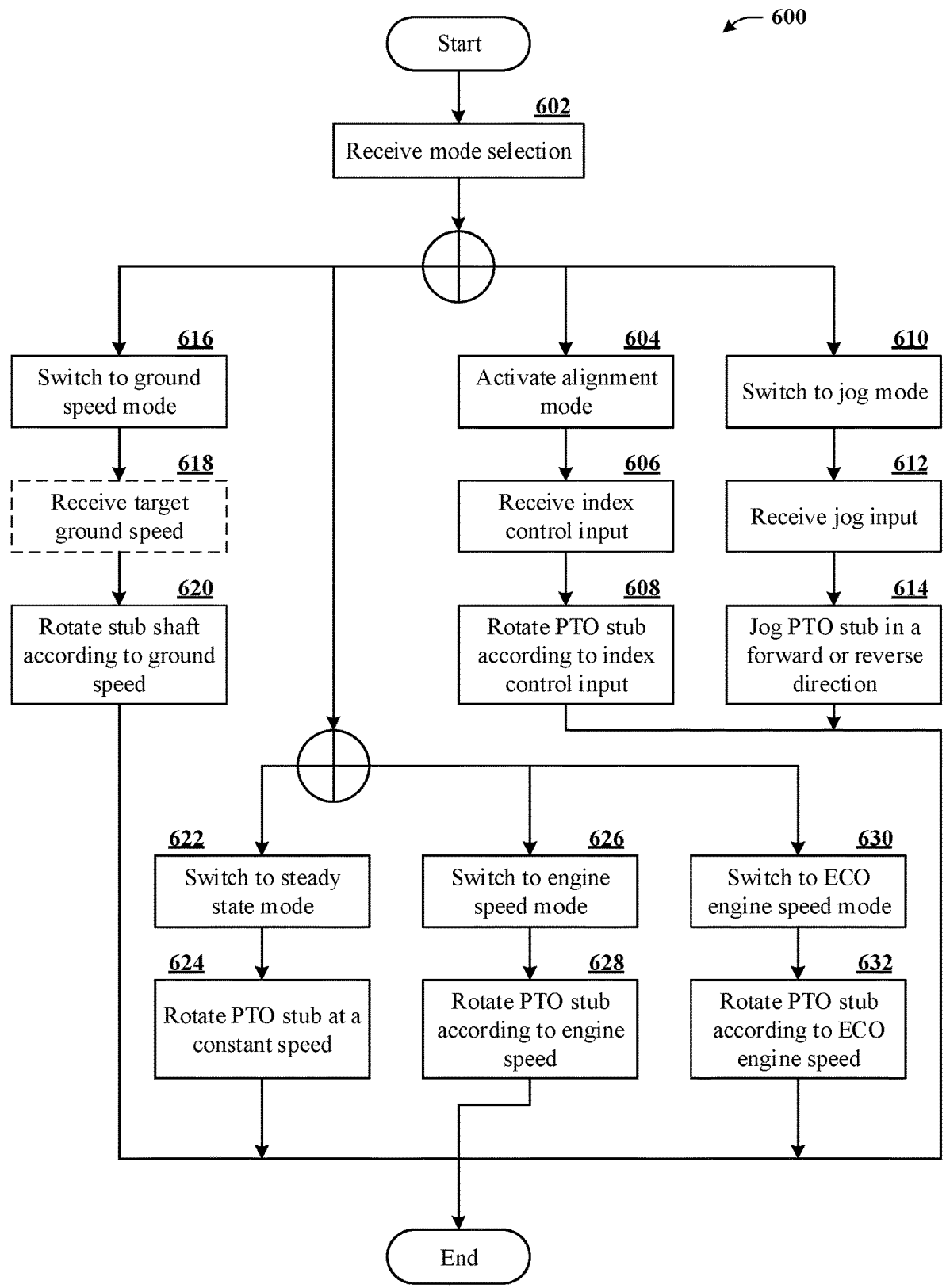
FIG. 6 illustrates an exemplary, non-limiting embodiment of a method for controlling a power take-off according to various aspects.

Referring now to FIG. 6, a method 600 for controlling a power take-off is illustrated. Method 600 may, in some embodiments, be performed by electric PTO system 100 described above. In particular, the method may be managed by controller 110 and MG2 130 may be controlled by controller 110 in accordance with method 600 to drive PTO stub shaft 132.

As shown in FIG. 6, method 600 may begin at 602 where a mode selection is received. In some embodiments, a master PTO switch may be turned off until after particular modes (e.g. non-alignment or jog modes) are selected and configured. Other mode may be selected via other means, such as manipulation of index control 150. Further, an allowable speed range for the PTO stub shaft 132 can be 0 rpm to a maximum rated shaft speed, regardless of other conditions (e.g. engine speed). In some modes, however, the controller 110 may execute a low speed startup. That is, the controller 110 may not activate rotation of the PTO stub shaft 132 unless engine speed is above a predetermined threshold. After startup, however, the controller 110 may drive PTO stub shaft speed 132 at any speed regardless of engine speed.

As shown in FIG. 6, method 600 branches depending on the mode selected at 602. For instance, at 604, the PTO system can activate an alignment mode following manipulation of index control 150. In alignment mode, the PTO stub shaft may be indexed to facilitate alignment with an implement. At 606, index control input is received. In an example, the index control input may be provided by an operator using index control 150, such as knob 300, described above. At 608, in accordance with the index control input, the PTO stub shaft is rotated. In alignment mode, the torque may be low (e.g. below some predetermined threshold) and a direction and speed of the rotation may correspond to the direction and speed the knob 300 is rotated. According to an aspect, the alignment mode may be selected and activated directly through operation of the index control 150, without an explicit mode selection via another interface.

When jog mode is selected, the PTO system switches to jog mode at 610. In one embodiment, jog mode may be selected via the operator interface 140, such as in-cab controls structured according to FIG. 5 for example. In an alternative embodiment, jog mode may be directly selected and engaged through operation of jog controls. The jog controls may be in-cab or may be positioned hear the PTO stub shaft (e.g. near the index control 150). At 612, jog input is received. The jog input may be a forward jog input or a reverse jog input, and may be a continuing signal so long as an associated jog switch is depressed. At 614, in accordance with the jog input, the PTO stub shaft is rotated in a forward or reverse direction. The reverse direction may be used for slug removal, for example, and may be usable with some agricultural implements such as large square balers. In jog mode, the torque may be low, like with alignment mode, and the speed may be pre-configured. For instance, the PTO stub shaft may be rotated with a speed of N rpms at X Nm and complete M revolutions in a forward or reverse direction.

Here, N, X, and M may be predetermined values or determined based on a type of implement coupled to the stub shaft.

At 616, the PTO system switches to ground speed mode, if selected. In this mode, a speed of the PTO stub shaft is proportional to a ground speed of a vehicle. This mode may be applicable to spreaders or tedders. For example, with a spreader, maintaining a relationship between ground speed and, gate operation, and impeller speed allows an operator to match nutrient application rate to ground speed. At 618, a target ground speed is optionally received. At 620, the PTO stub shaft is rotated in accordance with ground speed. Ground speed may be directly or indirectly monitored to control rotation of the PTO stub shaft and maintain the relationship.

According to an embodiment, a ratio, alpha, may be defined as a ratio between a default ground speed and PTO stub shaft speed. For example, a ground speed of 10 mph may equate to a driveshaft speed of 1000 rpm. When a default or desired PTO stub shaft speed is 1000 rpm, then alpha equals 1. If a target set point differs from the default, then the input received at 618 may be used to establish beta. A ratio between ground speed and PTO stub shaft speed may be denoted as beta. A target driveshaft speed can be defined as ground speed divided by beta. A ratio between the target driveshaft speed and an actual driveshaft speed can be used to scale a target stub shaft speed to provide a proportional PTO output.

Another operating mode available is a steady state mode. At 622, the PTO system may switch to steady state mode when selected. In the steady state mode, the PTO stub shaft maintains a set speed regardless of engine speed or ground speed. Accordingly, at 624, the PTO stub shaft is rotated at a constant speed.

Other operating modes relate to engine speed. At 626, the PTO system may switch to an engine speed mode when selected. In this mode, the PTO system maintains a fixed ratio between engine speed and PTO stub shaft speed. Accordingly, at 628, the PTO stub shaft is rotated based on engine speed. In this mode, for example, a target engine speed may be 1800 rpm and a target PTO stub shaft speed may be 1000 rpm. Thus, a fixed ratio of 1.8 may be utilized to scale a PTO stub shaft speed to engine speed. In other words, for a given sensed engine speed, the PTO stub shaft speed will be the engine speed divided by the fixed ratio (e.g. 1.8). It is to be appreciated, however, that a target PTO stub shaft speed may be 540 rpm.

An ECO engine speed mode is also available. At 630, the PTO system may switch to an ECO engine speed mode when selected. In this mode, the PTO system maintains a fixed ratio between engine speed and PTO stub shaft speed. Accordingly, at 632, the PTO stub shaft is rotated based on engine speed. In ECO engine speed mode, however, the fixed ratio is reduced compared to a standard engine speed mode. For example, an ECO engine speed may be 1500 rpm and a target PTO stub shaft speed may be 1000 rpm. Thus, a fixed ratio of 1.5 may be utilized to scale a PTO stub shaft speed to engine speed.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

The invention claimed is:

1. A system, comprising:
   an electric motor having an output coupled to a power take-off (PTO) stub shaft for coupling to an agricultural accessory, wherein the electric motor is dedicated to driving the PTO stub shaft and is the only input driving the PTO stub shaft;
   an engine configured to at least provide electrical power to the electric motor;
   an operator interface configured to acquire a user selection of an operating mode from a plurality of operating modes, wherein the plurality of operating modes include at least:
   an alignment mode;
   one or more jog modes;
   a steady state mode; and
   one or more reference speed rated modes; and
   a controller coupled to the electric motor and configured to control operation of the electric motor to regulate rotation of the PTO stub shaft via the electric motor in accordance with the operating mode selected.

2. The system of claim 1, wherein the output of the electric motor is coupled to the PTO stub shaft via a gear system that reduces a default operating speed of the electric motor to a default stub shaft speed, wherein the gear system is at least one of a planetary gear system or an off-axis gear system.

3. The system of claim 1, wherein in the one or more reference speed rated modes of the plurality of operating modes, the controller regulates the rotation of the PTO stub shaft relative to a reference speed.

4. The system of claim 3, wherein the reference speed is one of an engine speed or a ground speed.

5. The system of claim 1, wherein in the steady state mode and the controller maintains rotation of the PTO stub shaft at a constant speed.

6. The system of claim 1, wherein the one or more jog modes includes a forward jog mode and a reverse jog mode.

7. The system of claim 6, wherein in the forward or reverse jog modes, the controller jogs the PTO stub shaft in a forward or reverse direction, respectively, in response to a input received via the operator interface.

8. The system of claim 1, further comprising an index knob, wherein, in the alignment mode, the controller enables manipulation of the index knob by an operator to cause rotation of the PTO stub shaft.

9. The system of claim 1, wherein the system is coupled to an agricultural vehicle and the engine is an engine of the agricultural vehicle.

10. The system of claim 9, wherein the PTO stub shaft is exposed at one of a front portion or a rear portion of the agricultural vehicle.

11. A method for an agricultural machine, comprising:
    receiving, via an operator interface of the agricultural machine, user input indicative of a selection of an operating mode for a power take-off (PTO) of the agricultural machine, wherein the operating mode is selected from a group consisting of:
    an alignment mode;
    a forward jog mode;
    a reverse jog mode;
    a steady state mode;
    a ground speed rated mode;
    an engine speed rated mode; and
    a reduced engine speed rated mode; and
    controlling an electric machine coupled to a PTO stub shaft to enable rotation of the PTO stub shaft in accordance with the operating mode selected by the user input, wherein the electric machine is dedicated to the PTO stub shaft and is the only input driving the PTO stub shaft, and wherein the electric machine is powered by the engine of agricultural machine.

12. The method of claim 11, wherein a selected mode is the alignment mode and the method further comprises:
    receiving an input via an index knob positioned near the PTO stub shaft; and
    rotating the PTO stub shaft in accordance with the input from the index knob.

13. The method of claim 11, wherein a selected mode is one of the engine speed rated mode or the reduced engine speed rated mode and the method further comprises controlling a rotation speed of the PTO stub shaft according to a fixed ratio to an engine speed,
wherein a first fixed ratio associated with the engine speed rated mode is greater than a second fixed ratio associated with the reduced engine speed rated mode.

14. The method of claim 11, wherein a selected mode is the ground speed rated mode and the method further comprises maintaining a speed of the PTO stub shaft that is in proportion to a ground speed of the agricultural vehicle.

15. The method of claim 11, wherein a selected mode is one of the forward jog mode or the reverse jog mode and the method comprises:
receiving a jog input; and
controlling the PTO stub shaft to slowly rotate in response to the jog input, wherein a direction of rotation is determined based on whether the jog input specifies a forward or reverse direction.

16. The method of claim 11, further comprising actively braking the PTO stub shaft by reversing a current of the electric machine.

17. The system of claim 4, wherein the one or more reference speed rated modes related to engine speed include an engine speed rated mode and a reduced engine speed rated mode,
wherein the controller is further configured to control operation of the electric motor to provide a rotation speed of the PTO stub shaft according to a fixed ratio to the engine speed, and
wherein a first fixed ratio associated with the engine speed rated mode is greater than a second fixed ratio associated with the reduced engine speed rated mode.

18. The system of claim 1, wherein the controller is further configured to:
determine unintended motion of the PTO stub shaft due to an externally applied force; and
control the operation of the electric motor to counter the unintended motion of the PTO stub shaft.

* * * * *